United States Patent
Leshinsky et al.

(10) Patent No.: US 11,080,253 B1
(45) Date of Patent: Aug. 3, 2021

(54) DYNAMIC SPLITTING OF CONTENTIOUS INDEX DATA PAGES

(71) Applicant: Amazon Technologies, Inc., Seattle, WA (US)

(72) Inventors: Yan Valerie Leshinsky, Kirkland, WA (US); Kamal Kant Gupta, Seattle, WA (US); Tengiz Kharatishvili, Sammamish, WA (US); Alexandre Olegovich Verbitski, Woodinville, WA (US); Stefano Stefani, Issaquah, WA (US); Anurag Windlass Gupta, Atherton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 794 days.

(21) Appl. No.: 14/977,439

(22) Filed: Dec. 21, 2015

(51) Int. Cl.
*G06F 16/22* (2019.01)
*G06F 3/06* (2006.01)
*G06F 16/28* (2019.01)

(52) U.S. Cl.
CPC .......... *G06F 16/2272* (2019.01); *G06F 3/065* (2013.01); *G06F 3/067* (2013.01); *G06F 3/0611* (2013.01); *G06F 3/0653* (2013.01); *G06F 16/2282* (2019.01); *G06F 16/284* (2019.01)

(58) Field of Classification Search
CPC ................................................. G06F 17/30336
USPC .......................................................... 707/741
See application file for complete search history.

(56) References Cited

U.S. PATENT DOCUMENTS

| | | | | |
|---|---|---|---|---|
| 5,307,486 A | * | 4/1994 | Nakamigawa | G06F 16/9027 707/E17.012 |
| 5,568,638 A | * | 10/1996 | Hayashi | G06F 16/2246 707/613 |
| 5,822,749 A | * | 10/1998 | Agarwal | G06F 12/0866 |
| 7,673,291 B2 | | 3/2010 | Dias et al. | |
| 8,250,111 B2 | | 8/2012 | Huras et al. | |
| 8,682,872 B2 | | 3/2014 | Bright | |
| 2005/0171960 A1 | * | 8/2005 | Lomet | G06F 16/2246 |
| 2006/0004715 A1 | * | 1/2006 | Lock | G06F 16/2246 |
| 2007/0005631 A1 | * | 1/2007 | Barsness | G06F 16/2272 |
| 2009/0271408 A1 | * | 10/2009 | Graefe | G06F 16/2343 |
| 2009/0276430 A1 | * | 11/2009 | Bruso | G06F 16/2343 707/999.008 |
| 2010/0223243 A1 | * | 9/2010 | Huras | G06F 16/217 707/705 |
| 2011/0153580 A1 | * | 6/2011 | Bright | G06F 16/2246 707/696 |

(Continued)

*Primary Examiner* — Pierre M Vital
*Assistant Examiner* — Andrew N Ho
(74) *Attorney, Agent, or Firm* — Robert C. Kowert; Kowert, Hood, Munyon, Rankin & Goetzel, P.C.

(57) ABSTRACT

A storage engine may implement dynamic splitting of contentious data pages. Data pages may store data for a table of a data store as part of an indexing structure for the table. Access to the table may be provided by locating the corresponding data pages via the indexing structure. Access contention for different data pages may be monitored. Data pages may be identified for splitting based on the monitoring. A split operation for an identified data page may be formed to store the data on the identified data page on two different data pages so that subsequent access requests for the data are divided between the two data pages. Monitoring of access contention may also be performed to identify data pages for merging in order to consolidate access requests to a single data page.

20 Claims, 9 Drawing Sheets

(56) References Cited

U.S. PATENT DOCUMENTS

| | | | |
|---|---|---|---|
| 2011/0225165 A1* | 9/2011 | Burstein | G06F 16/2272 707/741 |
| 2012/0016881 A1* | 1/2012 | Hrle | G06F 16/22 707/746 |
| 2012/0089791 A1* | 4/2012 | Oberhofer | G06F 16/2282 711/154 |
| 2012/0296881 A1* | 11/2012 | Christian | G06F 16/2272 707/693 |
| 2013/0204902 A1* | 8/2013 | Wang | G06F 16/2365 707/797 |
| 2013/0339295 A1* | 12/2013 | Dean | G06F 3/0617 707/610 |
| 2014/0074841 A1* | 3/2014 | Majnemer | G06F 16/2308 707/737 |
| 2015/0309999 A1* | 10/2015 | Ng | G06F 16/285 707/809 |
| 2017/0116246 A1* | 4/2017 | Fang | G06F 17/30336 |

* cited by examiner

DYNAMIC SPLITTING OF CONTENTIOUS INDEX DATA PAGES

BACKGROUND

Data storage systems implement indexing structures to provide fast access operations. For example, in order to service a read request, an index structure that is maintained for data in a data store may be accessed in order to determine the location of requested data and service the read request. Index structures may be optimized for locating different types or combinations of data. Some index structures, for example, may be optimized for searching for unique or near-unique values (e.g., table primary keys). While other index structures may be optimized for searching for similar values or values with low entropy. As index structures are frequently accessed when servicing access requests, different mechanisms may be implemented to ensure that the index is efficient and consistent. Locking mechanisms, for instance, provide concurrency control to restrict access to portions of an index so that one execution thread may not change the value of portions of an index while another execution thread is performing an action dependent on the value in the portions of the index. These mechanisms are not without cost and may reduce the speed at which access requests can be processed utilizing an indexing structure.

Figure 1:
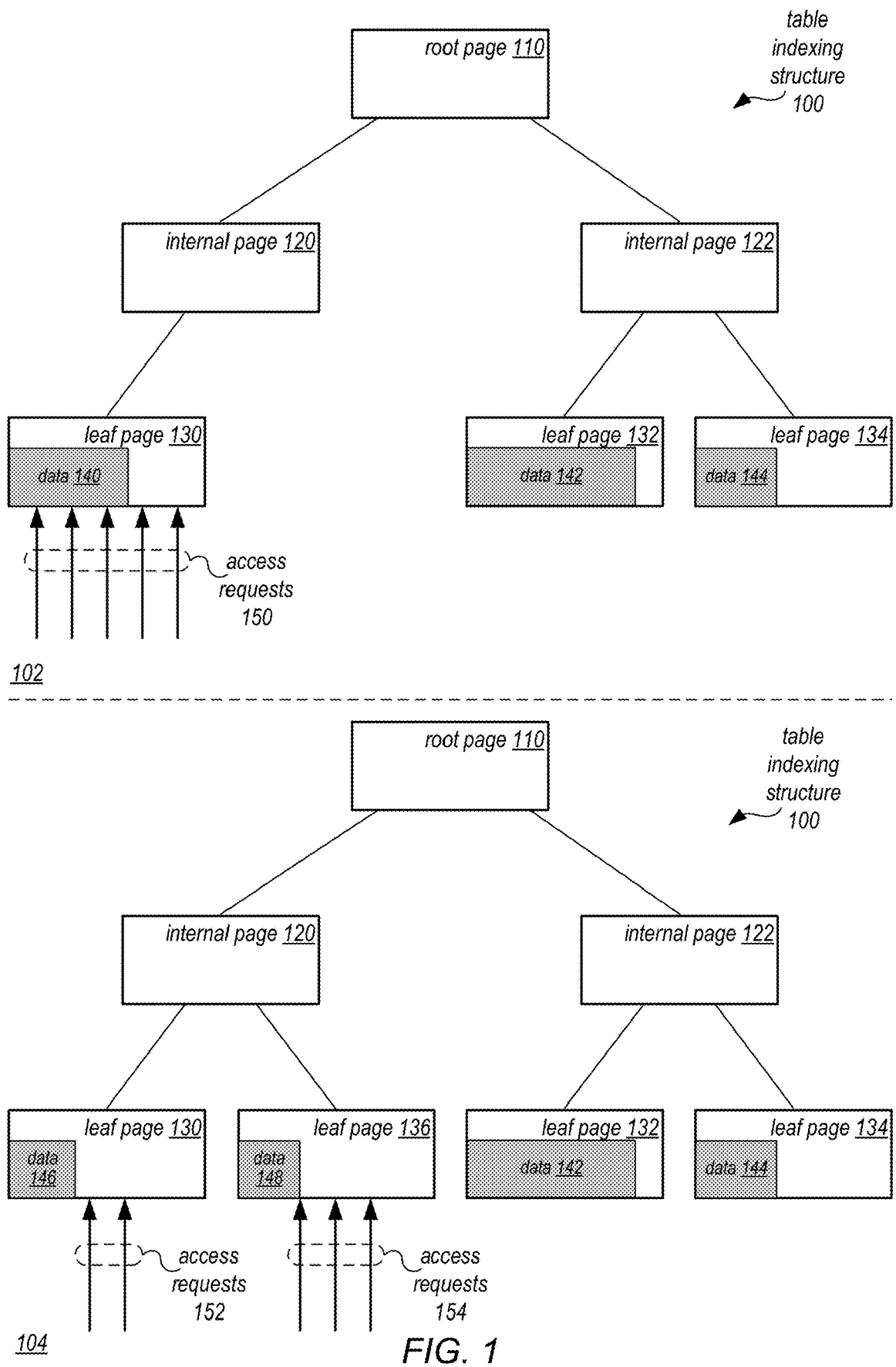
FIG. 1 is a logical diagram that illustrates dynamic splitting of contentious index data pages, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112 (f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of dynamic splitting of contentious index data pages are described herein. Data stores may utilize indexing structures to provide efficient access to data stored in the data store. In order to ensure consistent use of indexing structures, different concurrency mechanisms may be implemented for a table indexing structure in order to ensure that access requests do not disrupt, interrupt, corrupt, or otherwise change the performance of another access request. Locking mechanisms are one form of concurrency control that locks an index page, group of index pages, or the whole indexing structure in order to prevent other access requests from accessing (and potentially modifying) locked pages, and thus disrupting the performance of an access request that already acquired the lock. Such concurrency controls can have different granularities. Some locks, for instance, may be limited to particular leaf pages, so that data stored therein can be modified while still allowing other access requests to modify other non-locked leaf pages. Consider table indexing structure 100 illustrated in FIG. 1. One of access requests 150 may obtain a lock for leaf page 130, while other access requests (not illustrated) may be free to access leaf page 132 or 134.

Multiple access requests for data may be desired at the same time or overlapping periods of time. When concurrency mechanisms block one or more access requests to a data page, then those requests must wait until allowed to access the desired data page. Thus it may be that multiple access requests for a same data page may be contentious. Contentious data pages are typically "hot" data pages, which may be data pages that are accessed more frequently than other data pages. During ordered inserts to a database, for instance, adjacent records may be placed in the same page causing contention amongst requests to store data in the same page. Over time contention amongst access requests for data pages impacts the performance of processing the access requests. For example, multiple execution threads performing different access requests may have to suspend while waiting for access to a data page, increasing the amount of time to complete the access request and wasting system resources (e.g., overhead in system memory) in order to resume execution of the thread at a later time. Dynamic splitting of contentious index data pages may split the data in contentious data pages into different data pages in order to divide subsequent access requests for the data between the different data pages, reducing or eliminating contention at the different data pages.

FIG. 1 is a logical diagram that illustrates dynamic splitting of contentious index data pages, according to some embodiments. A data store may implement table indexing structure to provide an index to data store in the data store. Various types of data stores may utilize indexing structures, including, but not limited to, various types of structured data stores, relational, or non-relational databases, for data sets stored in a data store. For example a table indexing structure may be maintained for a table stored in the data store. Table indexing structure 100 may be a tree structure (e.g., b-tree or b+ tree) as illustrated in FIG. 1. However, various other indexing structures may be envisioned, and thus the tree illustrated in FIG. 1 is not intended to be limiting. Table indexing structure 100 may be maintained on one or more data pages (which may also be referred to as index pages or index data pages), such as root page 110, internal pages 120 and 122, and leaf pages 130, 132, and 134. Different index structures may be optimized for locating different types or combinations of data. Some index structures, for example, may be optimized for searching for unique or near-unique values (e.g., table primary keys).

Data pages of table indexing structure 100 may be linked together in order to provide a structure, scheme, or other arrangement for locating stored data. Different types of index structures may provide links between different pages, which may be traversed in order to search for locations of (or the data itself) data for servicing an access request. For example, in a b-tree structure each page may include links to other pages that provide locations of a range of certain data values, while a b+ tree may store data in some of the data pages in the index structure. As illustrated in FIG. 1, leaf pages 130, 132, and 134 store respective data 140, 142, and 144. Thus, access requests, such as access requests 150 for data 140 stored in leaf page 130, may have traversed table indexing structure 100 from root page 110 through internal page 120 to leaf page 130.

Contentious or hot data pages may be identified dynamically in order to perform a split operation. For example, as illustrated in scene 102 of FIG. 1, multiple access requests 150 are directed to leaf page 130 in order to access data 140 (e.g., to read, get, add, insert, remove, or otherwise modify data 140). A storage engine, or other system, component, or device that manages table indexing structure 100 may monitor access contention for pages 110, 120, 122, 130, 132, and 134 in order to identify pages for a split operation, such as discussed below with regard to FIGS. 3 and 6. For example, access requests, such as access requests 150 may be tracked for some or all pages, such as discussed below with regard to FIG. 7. This tracking information may be maintained and upon determining that a number of access requests for a page have been blocked or suspended in excess of a split threshold, the data page may be identified for a split operation. In some embodiments, a candidate list or watch list may be maintained which limits or identifies those pages for which tracking of access requests or form of monitoring for access contention is performed. Other prerequisites or criteria for performing a splitting operation may be enforced. For example, a determination may be made as to whether an indexing structure is in a certain form, such as whether a tree structure is above or below a certain height threshold (e.g., a height of 2 or less). Other criteria may include determining whether a minimum number of items exist in a page that has been identified for splitting (e.g., page stores 20 or more rows of a table).

Once leaf page 130 is identified, a split operation may be performed to split data 140 amongst different pages in indexing structure 100. For example, as illustrated in scene 104, data 140 has been split between leaf page 130 and new leaf page 136 (storing data 146 and 148 respectively). The split in the data may cause the number of access requests that would have formerly been directed to leaf page 130 (before the split operation) to be divided between leaf page 130 (e.g., access requests 152) and leaf page 136 (e.g., access requests 154). In this way, both leaf page 130 and 136 may have a smaller likelihood of provoking contention.

Figure 8:
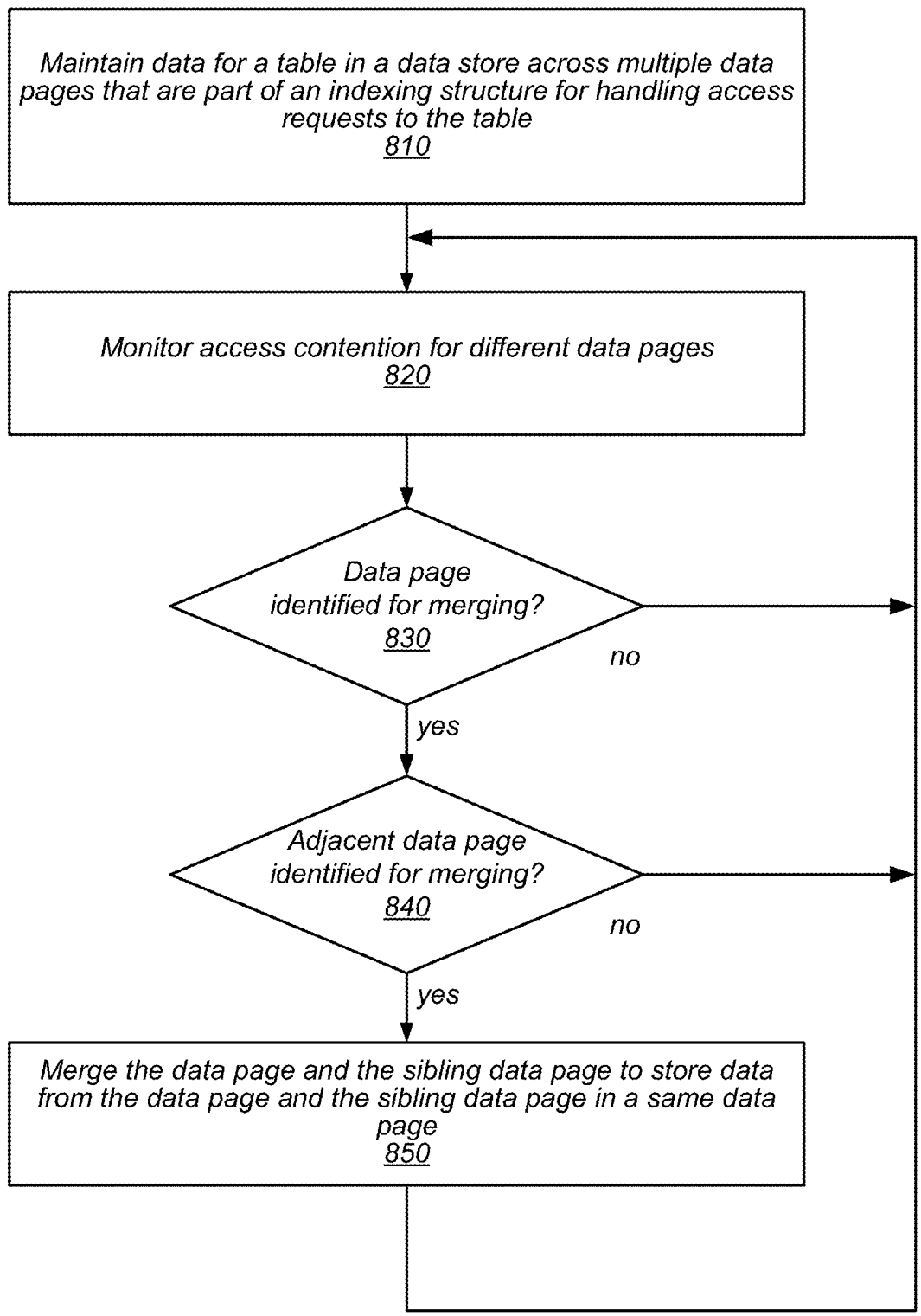
FIG. 8 is a high-level flowchart illustrating techniques for dynamically merging index data pages, according to some embodiments.

In addition to providing dynamic splitting of contentious index data pages, dynamic merging may also be performed, as discussed below with regard to FIG. 8. Similar to dynamic splitting, access contention may be monitored to identify those data pages for merging. For instance, access contention for a data page may indicate that the data page could be merged with another. Access contention data for adjacent data pages may be evaluated to determine if merging would beneficial and if so, a merging operation may be performed. Dynamic splitting or merging may be performed for an indexing structure automatically. In some embodiments, monitoring for splitting or merging may be manually enabled or disabled in response to a request (e.g., from a data store client).

Please note, FIG. 1 is provided as a logical illustration of a dynamic splitting of contentious index data pages, and is not intended to be limiting as to the arrangement, size, or number of pages implementing an indexing structure. Split operations may result in two (or more) new data pages with the original data page being replaced. Data may also be moved from the existing page to another existing page (e.g., moving data from leaf page 130 to leaf page 132).

The specification first describes an example of a database service that may implement dynamic splitting of contentious index data pages for tables hosted by the database service, according to various embodiments. The example database service may host tables for many different types of clients, in various embodiments. Included in the description of the example network-based database service are various aspects of the example network-based database service along with the various interactions between the database service and a separate distributed storage service which may store the data for tables. The specification then describes a flowchart of various embodiments of methods for performing dynamic splitting of contentious index data pages. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, log record manipulation, and/or various space management operations) may be offloaded from the database engine to the storage layer (or tier), such as a distributed storage system, and distributed across multiple nodes and storage devices. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). Log sequence numbers may be assigned to the redo log records from a log sequence number space. In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. As noted above, in some existing database systems, scaling a database instance may involve duplicating the entire database instance one or more times (including all of the example layers), and then adding glue logic to stitch them together. In some embodiments, the systems described herein may instead offload the functionality of durability and space management layer from the database tier to a separate storage layer, and may distribute that functionality across multiple storage nodes in the storage layer.

In some embodiments, the database systems described herein may retain much of the structure of the upper half of the database instance, such as query parsing and query optimization layer, a query execution layer, and a transactionality and consistency management layer, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the storage layer may also assume the responsibility for the replication of data stored on behalf of clients (and/or metadata associated with that data, such as redo log records) across multiple storage nodes.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum, as may be defined in a protection group policy for the data.

In some embodiments, the database tier may support the use of synchronous or asynchronous read replicas in the system, e.g., read-only copies of data on different nodes of the database tier to which read requests can be routed. In such embodiments, if the database engine head node for a given database receives a read request directed to a particular data page, it may route the request to any one (or a particular one) of these read-only copies. In some embodiments, the client-side driver in the database engine head node may be configured to notify these other nodes about updates and/or invalidations to cached data pages (e.g., in order to prompt them to invalidate their caches, after which they may request updated copies of updated data pages from the storage layer).

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

Figure 2:
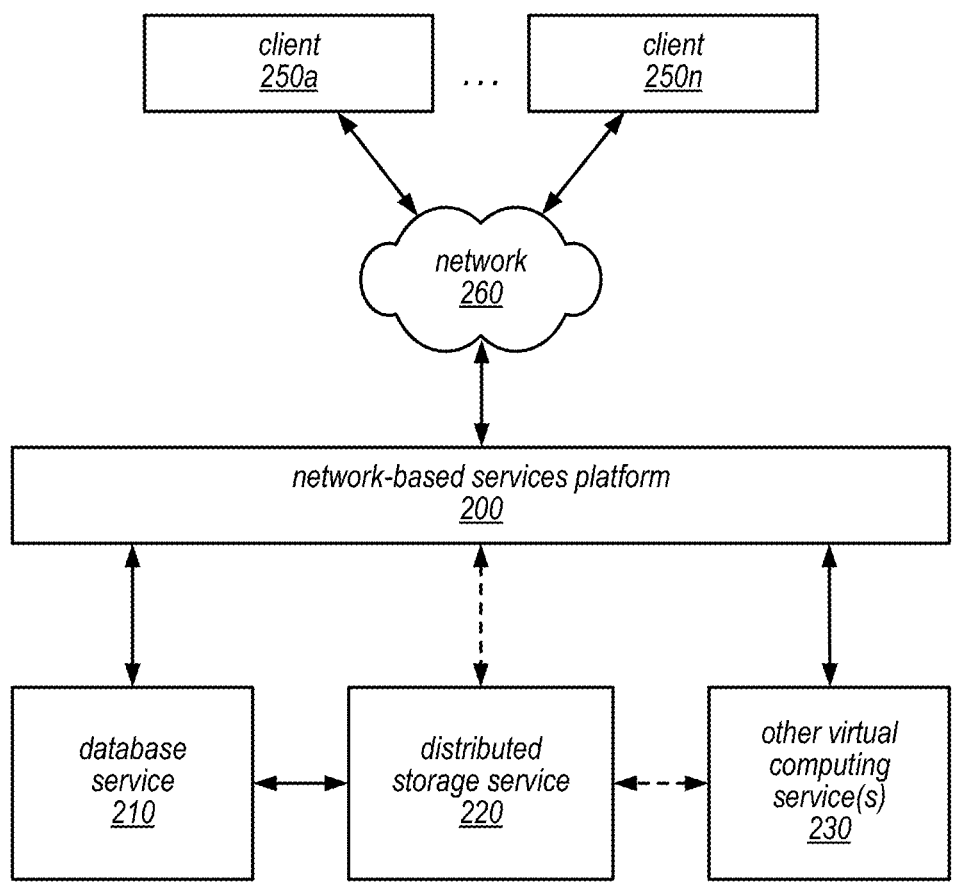
FIG. 2 is a block diagram illustrating a service system architecture that may be configured to implement a network-based database service and a network-based distributed storage service, according to some embodiments.

One embodiment of a service system architecture that may be configured to implement a network-based services-based database service is illustrated in FIG. 2. In the illustrated embodiment, a number of clients (shown as clients 250a-250n) may be configured to interact with a network-based services platform 200 via a network 260. Network-based services platform 200 may be configured to interface with one or more instances of a database service 210, a distributed storage service 220 and/or one or more other virtual computing services 230. Distributed storage service may be implemented as log-structured storage using a single log sequence number space. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to generate a snapshot, etc.). For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with network-based services platform 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 (e.g., a database service client) may be configured to provide access to network-based services-based storage of databases to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to network-based services platform 200 may be coordinated by client 250 and the operating system or file system on behalf of applications executing within the operating system environment.

Clients 250 may convey network-based services requests (e.g., a snapshot request, parameters of a snapshot request, read request, restore a snapshot, etc.) to and receive responses from network-based services platform 200 via network 260. In various embodiments, network 260 may encompass any suitable combination of networking hardware and protocols necessary to establish network-based-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data pages (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements database service 210, distributed storage service 220 and/or another virtual computing service 230 for processing. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (or the underlying systems that implement those services).

In some embodiments, network-based services platform 200 may also implement user authentication and access control procedures. For example, for a given network-based services request to access a particular database, platform 200 may be configured to ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, platform 200 may reject the corresponding network-based services request, for example by returning a response to the requesting client 250 indicating an error condition. Various access control policies may be stored as records or lists of access control information by database service 210, distributed storage service 220 and/or other virtual computing services 230.

It is noted that while network-based services platform 200 may represent the primary interface through which clients 250 may access the features of a database system that implements database service 210, it need not represent the sole interface to such features. For example, an alternate API that may be distinct from a network-based services interface may be used to allow clients internal to the enterprise providing the database system to bypass network-based services platform 200. Note that in many of the examples described herein, distributed storage service 220 may be internal to a computing system or an enterprise system that provides database services to clients 250, and may not be exposed to external clients (e.g., users or client applications). In such embodiments, the internal "client" (e.g., database service 210) may access distributed storage service 220 over a local or private network, shown as the solid line between distributed storage service 220 and database service 210 (e.g., through an API directly between the systems that implement these services). In such embodiments, the use of distributed storage service 220 in storing databases on behalf of clients 250 may be transparent to those clients. In other embodiments, distributed storage service 220 may be exposed to clients 250 through network-based services platform 200 to provide storage of databases or other information for applications other than those that rely on database service 210 for database management. This is illustrated in FIG. 2 by the dashed line between network-based services platform 200 and distributed storage service 220. In such embodiments, clients of the distributed storage service 220 may access distributed storage service 220 via network 260 (e.g., over the Internet). In some embodiments, a virtual computing service 230 may be configured to receive storage services from distributed storage service 220 (e.g., through an API directly between the virtual computing service 230 and distributed storage service 220) to store objects used in performing computing services 230 on behalf of a client 250. This is illustrated in FIG. 2 by the dashed line between virtual computing service 230 and distributed storage service 220. In some cases, the accounting and/or credentialing services of platform 200 may be unnecessary for internal clients such as administrative clients or between service components within the same enterprise.

Although not illustrated, in various embodiments distributed storage service 220 may be configured to interface with backup data store, system, service, or device. Various data, such as data pages, log records, and/or any other data maintained by distributed storage service internal clients, such as database service 210 or other virtual computing services 230, and/or external clients such as clients 250*a* through 250*n*, may be sent to a backup data store.

Note that in various embodiments, different storage policies may be implemented by database service 210 and/or distributed storage service 220. Examples of such storage policies may include a durability policy (e.g., a policy indicating the number of instances of a database (or data page thereof) that will be stored and the number of different nodes on which they will be stored) and/or a load balancing policy (which may distribute databases, or data pages thereof, across different nodes, volumes and/or disks in an attempt to equalize request traffic). In addition, different storage policies may be applied to different types of stored items by various one of the services. For example, in some embodiments, distributed storage service 220 may implement a higher durability for redo log records than for data pages.

Figure 3:
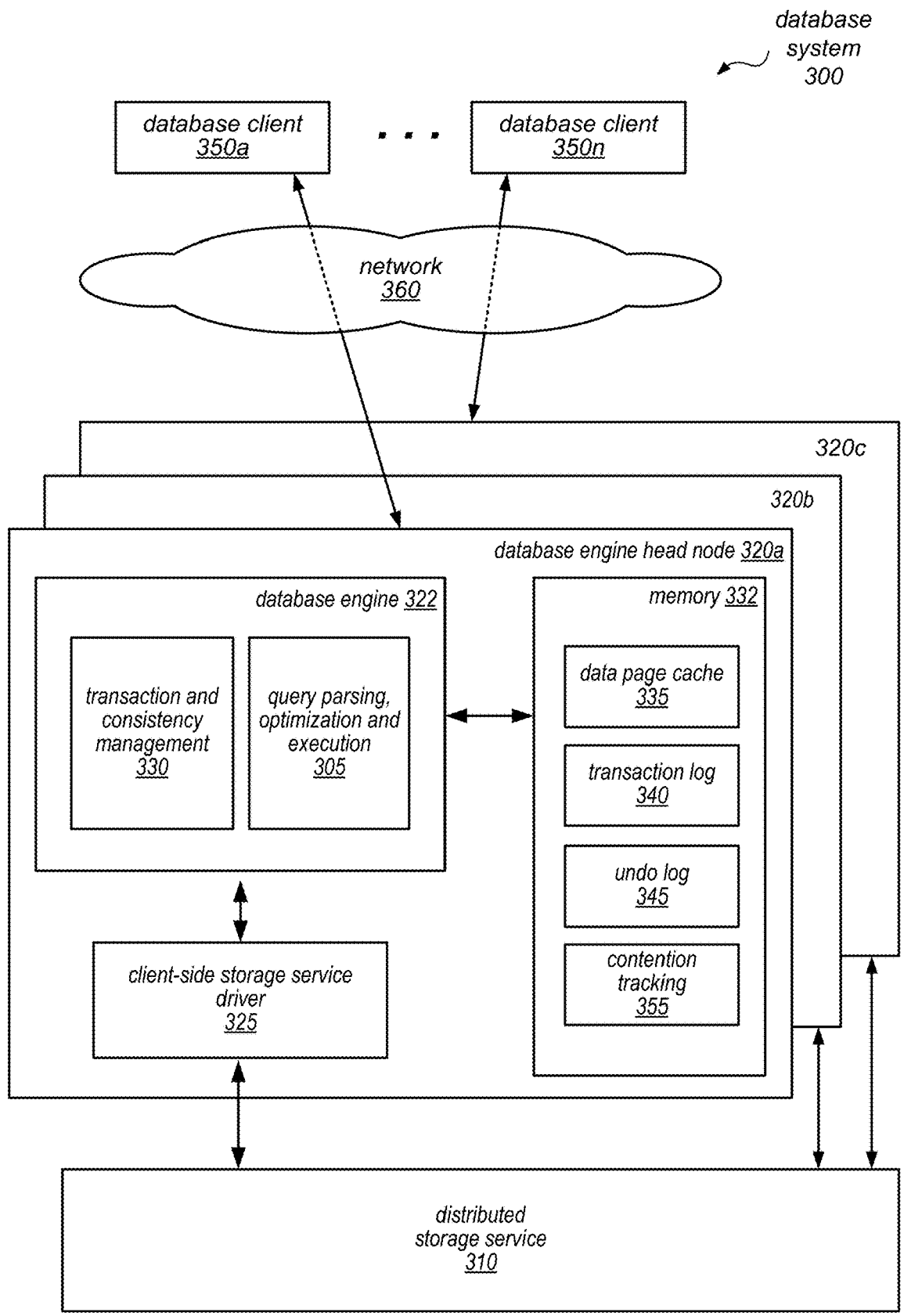
FIG. 3 is a block diagram illustrating various components of a database system that includes a database engine that implements dynamic splitting of contentious index data pages and a separate distributed storage service, according to some embodiments.

FIG. 3 3 is a block diagram illustrating various components of a database system that includes a database engine that implements dynamic splitting of contentious index data pages and a separate distributed storage service, according to some embodiments. In this example, database system 300 includes a respective database engine head node 320 for each of several databases and a distributed storage service 310 (which may or may not be visible to the clients of the database system, shown as database clients 350*a*-350*n*). As illustrated in this example, one or more of database clients 350*a*-350*n* may access a database head node 320 (e.g., head node 320*a*, head node 320*b*, or head node 320*c*, each of which is a component of a respective database instance) via network 360 (e.g., these components may be network-addressable and accessible to the database clients 350*a*-350*n*). However, distributed storage service 310, which may be employed by the database system to store a database volume (such as data pages of one or more databases, as well as redo log records and/or other metadata associated therewith) on behalf of database clients 350*a*-350*n*, and to perform other functions of the database system as described herein, may or may not be network-addressable and accessible to the storage clients 350*a*-350*n*, in different embodiments. For example, in some embodiments, distributed storage service 310 may perform various storage, access, change logging, recovery, log record manipulation, and/or space management operations in a manner that is invisible to storage clients 350a-350n.

As previously noted, each database instance may include a single database engine head node 320 that receives requests (e.g., a snapshot request, etc.) from various client programs (e.g., applications) and/or subscribers (users), then parses them, optimizes them, and develops an execution plan to carry out the associated database operation(s). In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate.

In some embodiments, query parsing, optimization and execution component 305 may monitor access contention for index data pages of an indexing structure for a table hosted in database service 210 to perform dynamic splitting of those index data pages identified as contentious. For example, in some embodiments, query parsing, optimization and execution component 305 track access requests to index data pages in contention tracking 355 in memory 332. As the number of data pages in an indexing structure for a database may be large, tracking information may be maintained for a limited number of data pages. For instance, different data pages may be identified as candidate data pages (as discussed below with regard to FIG. 7). A data page may be identified as a candidate if attempts to access the data page are blocked, delayed, suspended or any other wait incurred for the access request. In some embodiments, data pages may have to satisfy other criteria to be considered a candidate data page. For example, the number of rows or records stored in the data page may have to be above a minimum number of items. In this way, split operations are not performed for contentious data pages where splitting the data will not likely result in a division of access requests between the two pages. Consider a scenario where access requests update a same row of a table stored at a data page. If these updates are contending with one another then a split operation for the data page will not divide requests directed to the page storing the row as other data moved to a different data page is not the reason for the contention and the row itself may not be divided. A counter of attempts to access the page that incur waits may be maintained and incremented when further attempts are made that incur waits (and possibly decremented when waits are not incurred). If the number of waits for a candidate page exceeds a split threshold (e.g., waits>30), then the data page maybe identified for a split operation.

Once a data page is identified for a split operation, query parsing, optimization and execution component 305 may wait until a next received access request for the data page to perform the split operation on the data page. In this way, both the split and the access request may be performed while a lock to the page is held. However, in some embodiments, a background process may be implemented to perform split operations independent of foreground operations, such as processing access requests. Thus, the previous example need not be limiting.

Similar to monitoring to dynamically split index data pages, query parsing, optimization and execution component 305 may utilize tracking information to identify index data pages for merging. For example, query parsing, optimization and execution component 305 may maintain a history (not illustrated) of those data pages previously split for contention. If contention for those pages falls below a threshold for a period of time, then query parsing, optimization and execution component 305 may check to see if an adjacent page in the indexing structure is also below the threshold. If both pages are below, then query parsing, optimization and execution component 305 may merge the data pages.

To perform split operations or merge operations, query parsing, optimization and execution component 305 may generate and send the appropriate requests, such as redo log records to various storage nodes within the distributed storage service 310 storing the data pages of the indexing structure, as discussed below with regard to FIG. 5.

Database engine head node 320a may also include a data page cache 335, in which data pages that were recently accessed may be temporarily held. As illustrated in FIG. 3, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance. As illustrated in FIG. 3, database engine head node 320a may also include a transaction log 340 and an undo log 345, which may be employed by transaction and consistency management component 330 to track the status of various transactions and roll back any locally cached results of transactions that do not commit.

Database engine head node 320a may also include a client-side storage service driver 325, which may route read requests and/or redo log records to various storage nodes within distributed storage service 310, receive write acknowledgements from distributed storage service 310, receive requested data pages from distributed storage service 310, and/or return data pages, error messages, or other responses to query parsing, optimization, and execution component 305 (which may, in turn, return them to database client 350a). Client-side storage device may maintain mapping information about the database volume stored in distributed storage service 310, such that a particular protection group maintaining a partition of the database volume may be determined. Read requests and redo log records may then be routed to storage nodes that are members of the protection group according to the partition of user data to which the read request is directed or to which the redo log record pertains.

Note that each of the other database engine head nodes 320 illustrated in FIG. 3 (e.g., 320b and 320c) may include similar components and may perform similar functions for queries received by one or more of database clients 350a-350n and directed to the respective database instances of which it is a component.

In some embodiments, the distributed storage systems described herein may organize data in various logical data volumes, extents (which may include partitions of the user data space in the volume and a segmentation of the log for the volume) made durable among a protection group of storage nodes, segments (which may be data stored on an individual storage node of a protection group) and pages for storage on one or more storage nodes. For example, in some embodiments, each database is represented by a logical volume, and each logical volume is partitioned over a collection of storage nodes into extents. A protection group may be composed of different storage nodes in the distributed storage service that together make an extent durable. Multiple segments, each of which lives on a particular one of the storage nodes in a protection group, are used to make the extent durable.

In some embodiments, each data page is stored in a segment, such that each segment stores a collection of one or more data pages and a change log (also referred to as a redo log) (e.g., a log of redo log records) for each data page that it stores. Thus, change logs may be log records segmented to the protection group of which the segment is a member. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration, such as in a protection group (which may be specified by the client on whose behalf the databases are being maintained in the database system). For example, in different embodiments, one, two, or three copies of the data or change logs may be stored in each of one, two, or three different availability zones or regions, according to a default configuration, an application-specific durability preference, or a client-specified durability preference.

Figure 4:
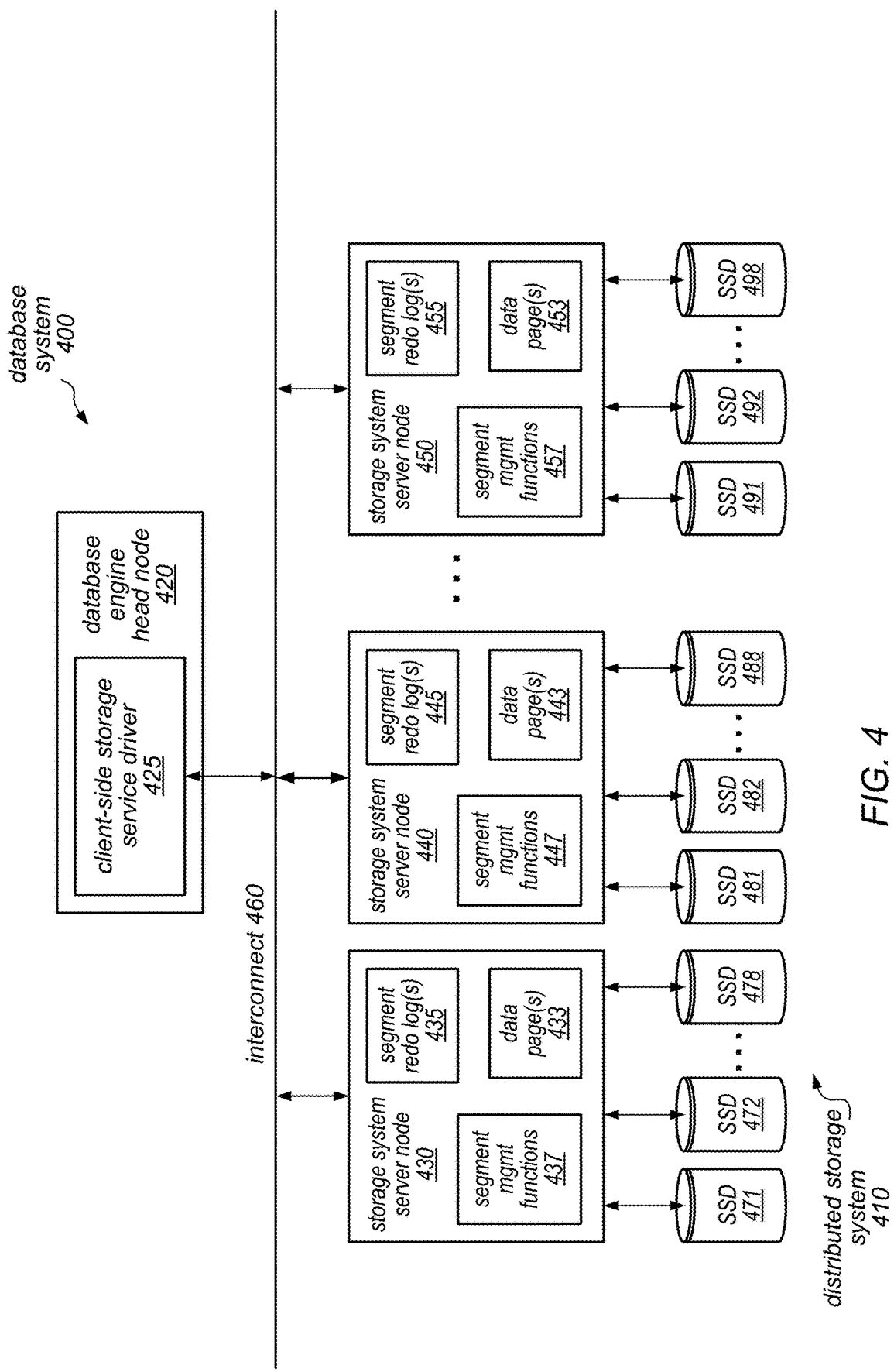
FIG. 4 is a block diagram illustrating a distributed storage system, according to some embodiments.

As used herein, the following terms may be used to describe the organization of data by a distributed storage system as illustrated and described by FIG. 4, according to various embodiments. However, in other embodiments, such as data stores that do not implement log-structured storage, such terms may be differently defined. Thus the following discussion of terms is provided to include different examples and is not intended to be limiting as to other definitions known to those of ordinary skill in the art.

Volume: A volume may be a logical concept representing a highly durable unit of storage that a user/client/application of the storage system understands. More specifically, a volume is a distributed store that appears to the user/client/application as a single consistent ordered log of write operations to various user pages of a database. Each write operation may be encoded in a User Log Record (ULR), which represents a logical, ordered mutation to the contents of a single user page within the volume. As noted above, a ULR may also be referred to herein as a redo log record. Each ULR may include a unique identifier (e.g., a Logical Sequence Number (LSN)) assigned from a log sequence number space. Each ULR may be persisted to one or more synchronous segments in the log-structured distributed store that form a Protection Group (PG) maintaining the partition of user data space (i.e. extent) to which the update indicate by the log record pertains in order to provide high durability and availability for the ULR. A volume may provide an LSN-type read/write interface for a variable-size contiguous range of bytes.

In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment may be a limited-durability unit of storage assigned to a single storage node. Multiple segments may be implemented in a protection group to persist an extent. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page may be a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page may be a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Log records may include metadata, such as pointers or back links, that indicate a previous LSN for log record maintained at a particular segment and/or the previous LSN in the log sequence number space. Control Log Records (CLRs), which are generated by the storage system, may also contain control information used to keep track of metadata such as the current unconditional volume durable LSN (VDL). Null Log Records (NLRB) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record may be the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages may be the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware. Some user pages may be index data pages which may be dynamically split or merged as discussed above.

Data page: A data page may be a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node may be a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance. Multiple storage nodes may together implement a protection group, in some embodiments.

SSD: As referred to herein, the term "SSD" may refer to a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

One embodiment of a distributed storage system is illustrated by the block diagram in FIG. 4. In at least some embodiments, storage nodes 430-450 may store data for different clients as part of a multi-tenant storage service. For example, the various segments discussed above and below with regard to FIG. 9, may correspond to different protection groups and volumes for different clients.

In some embodiments, a database system 400 may be a client of distributed storage system 410, which communicates with a database engine head node 420 over interconnect 460. As in the example illustrated in FIG. 3, database engine head node 420 may include a client-side storage service driver 425. In this example, distributed storage system 410 includes multiple storage system server nodes (including those shown as 430, 440, and 450), each of which includes storage for data pages and redo logs for the segment (s) it stores, and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery (e.g., determining candidate log records for volume recovery), and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 4, storage system server node 430 includes data page(s) 433, segment redo log(s) 435, segment management functions 437, and attached SSDs 471-478. Again note that the label "SSD" may or may not refer to a solid-state drive, but may more generally refer to a local block storage volume, regardless of its underlying hardware. Similarly, storage system server node 440 includes data page(s) 443, segment redo log(s) 445, segment management functions 447, and attached SSDs 481-488; and storage system server node 450 includes data page(s) 453, segment redo log(s) 455, segment management functions 457, and attached SSDs 491-498.

In some embodiments, each of the storage system server nodes in the distributed storage system may implement a set of processes running on the node server's operating system that manage communication with the database engine head node, e.g., to receive redo logs, send back data pages, etc. In some embodiments, all data blocks written to the distributed storage system may be backed up to long-term and/or archival storage (e.g., in a remote key-value durable backup storage system).

Figure 5:
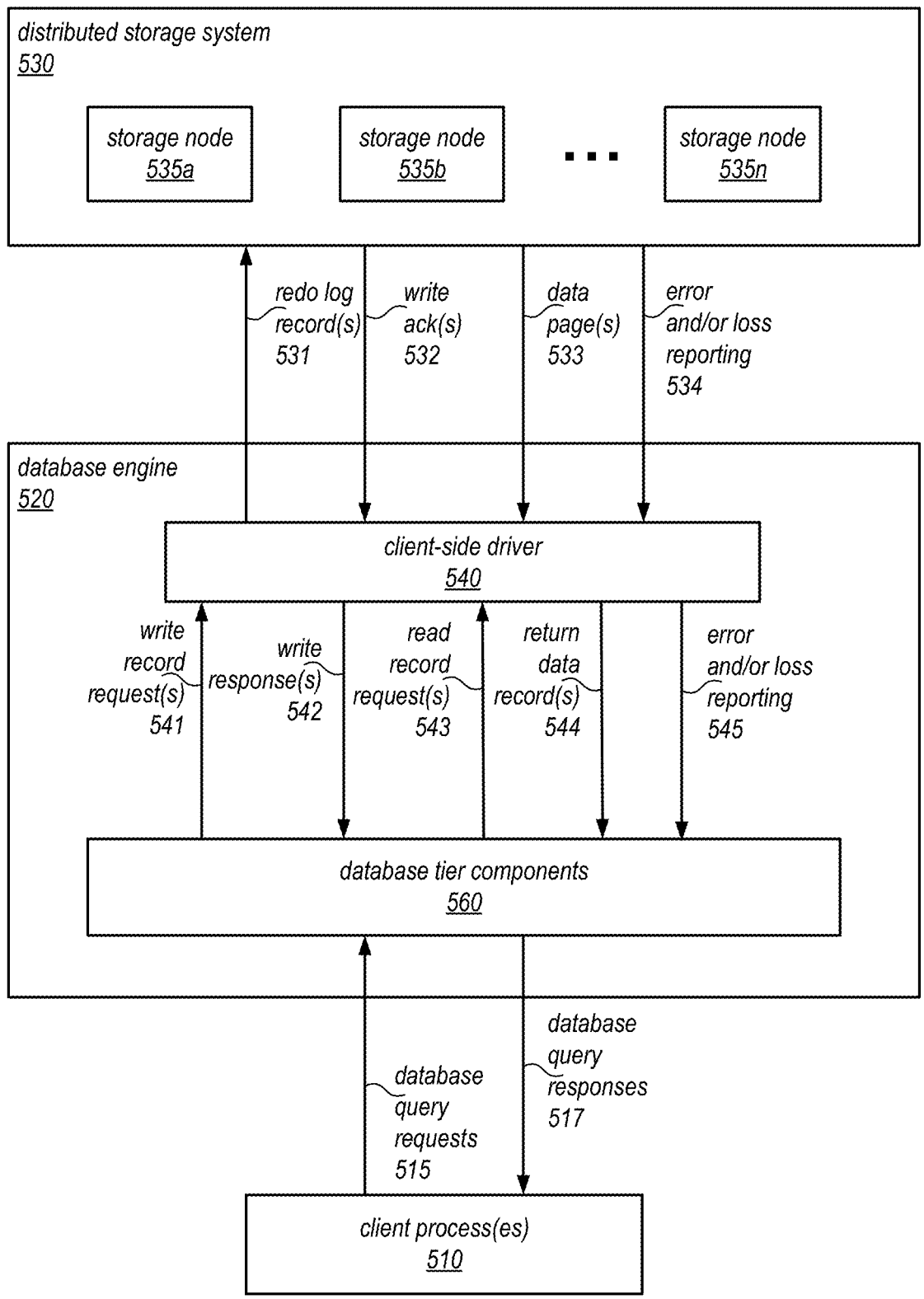
FIG. 5 is a block diagram illustrating the use of a separate distributed storage system in a database system, according to some embodiments.

FIG. 5 is a block diagram illustrating the use of a separate distributed storage system in a database system, according to one embodiment. In this example, one or more client processes 510 may store data to one or more databases maintained by a database system that includes a database engine 520 and a distributed storage system 530. In the example illustrated in FIG. 5, database engine 520 includes database tier components 560 and client-side driver 540 (which serves as the interface between distributed storage system 530 and database tier components 560). In some embodiments, database tier components 560 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3). In various embodiments, database engine 520 may have obtained a volume epoch indicator or other identifier from distributed storage system 530 granting access writes to a particular data volume, such as by sending a request to open the data volume to distributed storage system 530.

In this example, one or more client processes 510 may send database query requests 515 (which may include read and/or write requests targeting data stored on one or more of the storage nodes 535a-535n) to database tier components 560, and may receive database query responses 517 from database tier components 560 (e.g., responses that include write acknowledgements and/or requested data). Each database query request 515 that includes a request to write to a data page may be parsed and optimized to generate one or more write record requests 541, which may be sent to client-side driver 540 for subsequent routing to distributed storage system 530. In this example, client-side driver 540 may generate one or more redo log records 531 corresponding to each write record request 541, and may send them to specific ones of the storage nodes 535 of specific protection groups storing the partition user data of user data space to which the write record request pertains in distributed storage system 530. Client-side driver 540 may generate metadata for each of the redo log records that includes an indication of a previous log sequence number of a log record maintained at the specific protection group. Distributed storage system 530 may return a corresponding write acknowledgement(s) 523 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In this example, each database query request 515 that includes a request to read a data page may be parsed and optimized to generate one or more read record requests 543, which may be sent to client-side driver 540 for subsequent routing to distributed storage system 530. In this example, client-side driver 540 may send these requests to specific ones of the storage nodes 535 of distributed storage system 530, and distributed storage system 530 may return the requested data pages 533 to database engine 520 (specifically to client-side driver 540). Client-side driver 540 may send the returned data pages to the database tier components 560 as return data records 544, and database tier components 560 may then send the data pages to one or more client processes 510 as database query responses 517.

In some embodiments, various error and/or data loss messages 534 may be sent from distributed storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, the APIs 531-534 of distributed storage system 530 and the APIs 541-545 of client-side driver 540 may expose the functionality of the distributed storage system 530 to database engine 520 as if database engine 520 were a client of distributed storage system 530. For example, database engine 520 (through client-side driver 540) may write redo log records or request data pages through these APIs to perform (or facilitate the performance of) various operations of the database system implemented by the combination of database engine 520 and distributed storage system 530 (e.g., storage, access, change logging, recovery, and/or space management operations). As illustrated in FIG. 5, distributed storage system 530 may store data blocks on storage nodes 535a-535n, each of which may have multiple attached SSDs. In some embodiments, distributed storage system 530 may provide high durability for stored data block through the application of various types of redundancy schemes.

As noted above, in some embodiments, the functional components of a database system may be partitioned between those that are performed by the database engine and those that are performed in a separate, distributed storage system. In one specific example, in response to receiving a request from a client process (or a thread thereof) to insert something into a database (e.g., to update a single data block by adding a record to that data block), one or more components of the database engine head node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the distributed storage service and to send it to the distributed storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log both of which may be used locally (in the database tier) for ensuring transactionality. However, unlike in traditional database systems, the systems described herein may shift the responsibility for applying changes to data blocks to the storage system (rather than applying them at the database tier and shipping the modified data blocks to the storage system).

Figure 6:
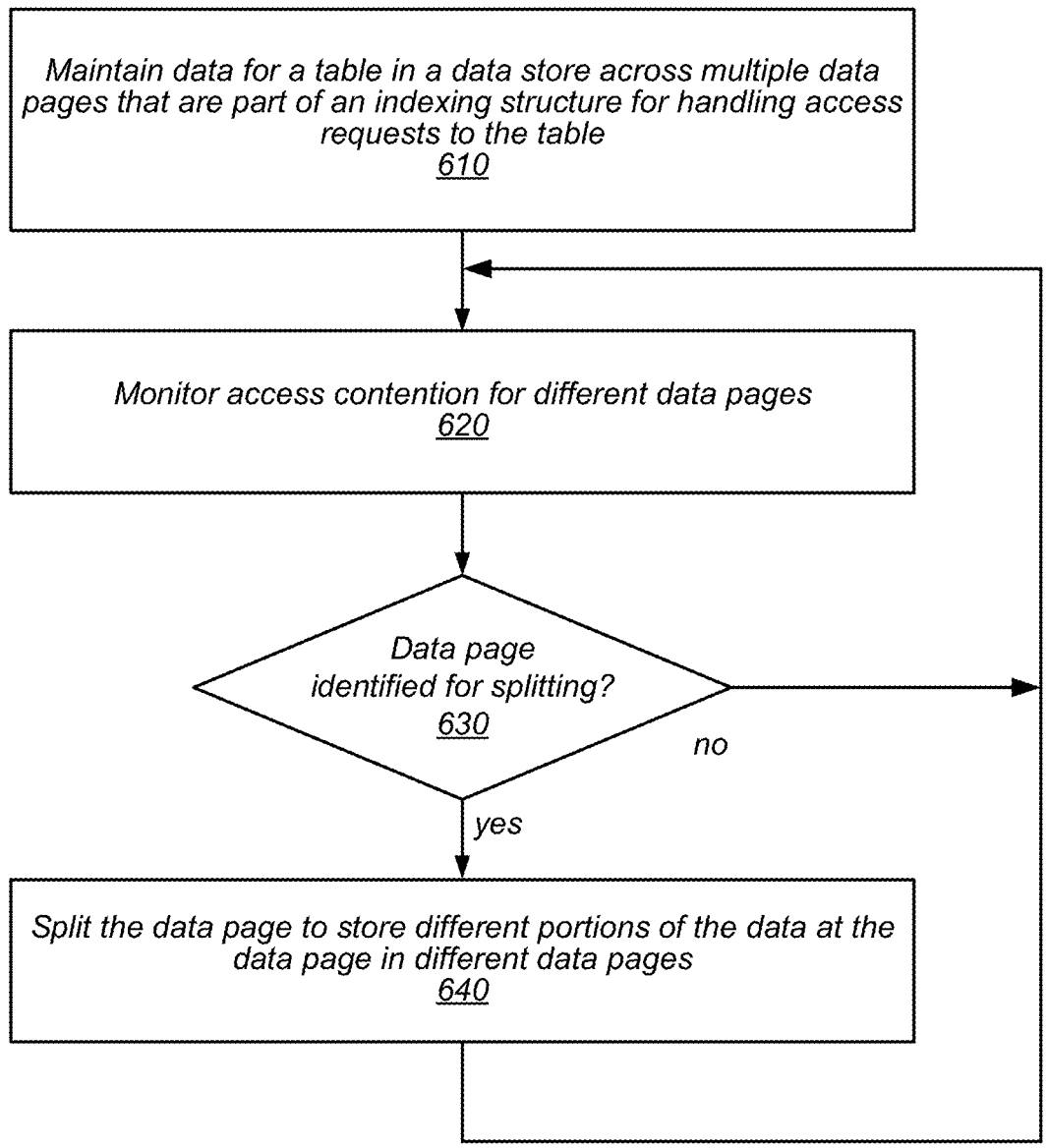
FIG. 6 is a high-level flowchart illustrating techniques for dynamically splitting contentious index data pages, according to some embodiments.

The database service distributed storage service discussed in FIGS. 2 through 5 provide examples of a system that may implement dynamic splitting of contentious index data pages. However, various other types of data stores (e.g., database systems that do not utilize a separate storage system) may implement dynamic splitting of contentious index data pages. FIG. 6 is a high-level flowchart illustrating techniques for dynamically splitting contentious index data pages, according to some embodiments, which the systems described above as well as other data stores may implement.

As indicated at 610, data may be maintained for a table in a data store across multiple data pages. A data store may be any type of data store that maintains data on behalf of clients in order to provide access to the data. For example, different types of database systems such as relational or non-relational database systems may store data for clients. The multiple data pages may be implemented as part of an indexing structure for the handling access requests to the table. For example, when access requests are received the indexing structure may be utilized to locate the data specified in the access request.

As indicated at 620, access contention for different data pages in the indexing structure may be monitored, in some embodiments. Monitoring access contention may be performed in different ways. For instance, tracking information may be maintained and updated in response to access requests, as discussed below with regard to FIG. 7. Tracking information may include any information which can be used to analyze or identify contention on a data page, such as the number of access requests to a data page by type (e.g., read requests or write requests), the number of items stored in the data page, or the number of waits incurred when accessing the data page. The tracking information may then be evaluated to determine whether a split operation should be performed for a data page. Some data pages may be excluded from monitoring. For instance, if data pages are a particular type of index data page like internal nodes of a tree indexing structure or a root node of a tree indexing structure, then the particular type of data page may not be monitored. In some embodiments, the data stored on (or pointed to) by a particular data page may be exclude the data page for monitoring. For instance, if the index data page only stores a small number of items (e.g., less than a minimum number of items), then the data page may be excluded from monitoring.

Monitoring may be automatically enabled or disabled for an indexing structure, in some embodiments. For example, a workload for a table maybe analyzed to determine whether the pattern of access requests directed to the table could cause access contention at particular data pages that could be split. If the workload were analyzed to indicate that contention would be infrequent or occur at different data pages over time, then dynamic splitting of data pages may not be as beneficial, and thus dynamic splitting may be automatically disabled. The reverse scenario may also occur where the workload indicates that dynamic splitting should be enabled. In some embodiments, a disabling event may be detected, such as determining that a storage limitation for the indexing structure is exceeded or some other determination that split operations for reasons other than lack of storage space may be prohibited (which may prohibit splits of contentious data pages), and thus dynamic splitting may be disabled.

Data stores may provide clients with the option to manually enable or disable dynamic splitting of data pages, in some embodiments. For instance, a data store may provide a programmatic interface (e.g., API) which allows a client to send a request to disable dynamic splitting of pages for a particular table hosted in the data store.

Once identified, the data page may be split to store different portions of the data in the data page in different data pages, as indicated 640, in various embodiments. A split operation may create new data pages or utilize existing data pages. In some embodiments, the split operation may be performed when an access request (e.g., a write request) to the data page is received at the data store. Corresponding changes to other data pages in the indexing structure pointing to the split data page may also be performed (e.g., by changing pointers in internal data pages and/or a root data page in a tree indexing structure).

Figure 7:
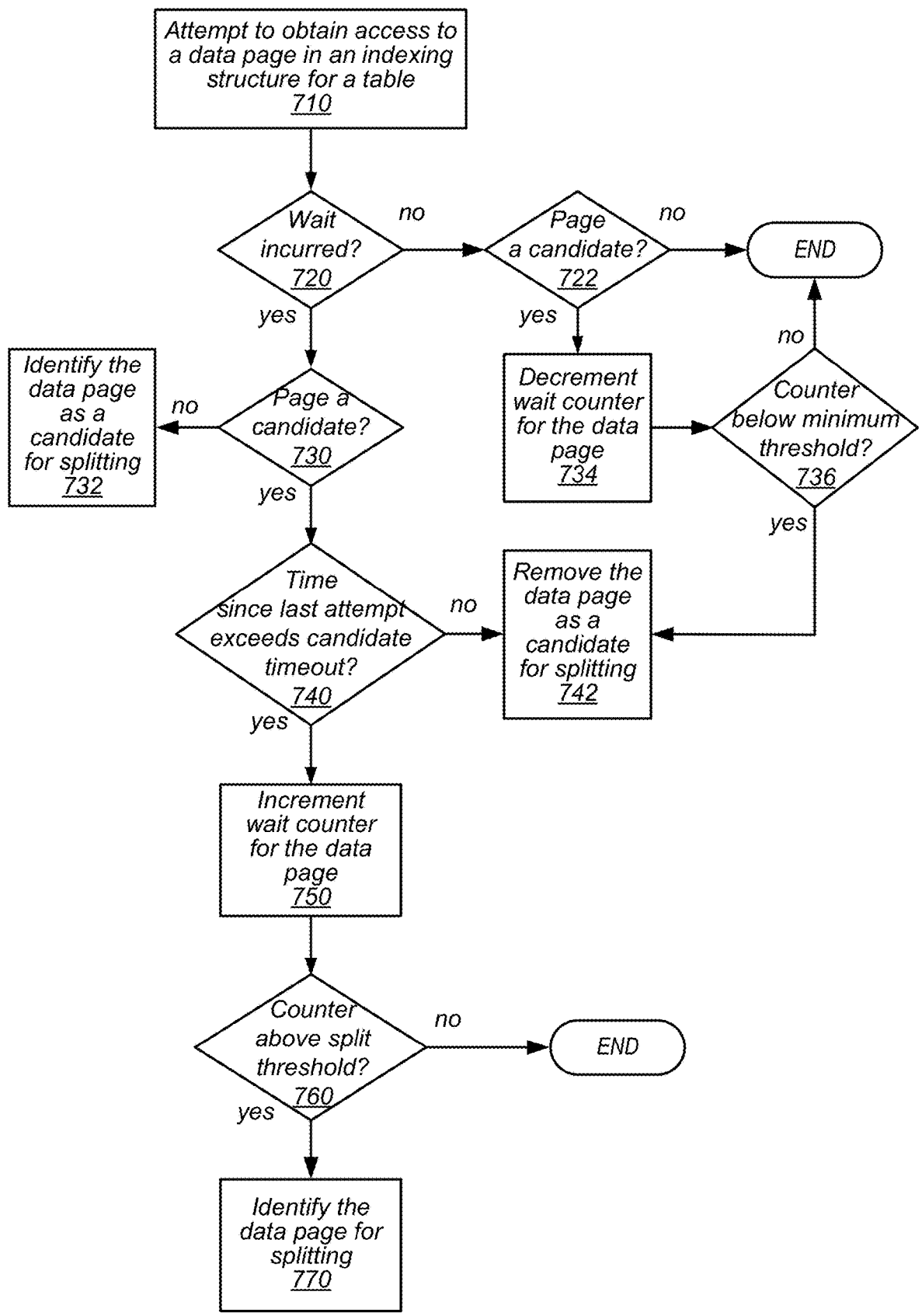
FIG. 7 is a high-level flowchart illustrating techniques to monitor and identify index data pages for splitting, according to some embodiments.

Monitoring of access contention may be performed in different ways. In at least some embodiments, tracking information may be updated for data pages in response to attempts to access the data pages. As the number of data pages for a database can be large, a set of candidate pages out of the larger set of all data pages may be tracked. FIG. 7 is a high-level flowchart illustrating techniques to monitor and identify index data pages for splitting, according to some embodiments. As indicated at 710, an attempt to obtain access to a data page in an indexing structure for a table may be made. An exclusive lock, or other concurrency mechanism, may be requested or invoked for the access request to the data page. If the attempt to obtain access to the data page is successful, then no wait is incurred, as indicated by the negative exit from 720. If the data page is already a candidate data page, then a wait counter for the data page may be decremented, as indicated at 734. A check may also be performed to determine whether the counter is below a minimum threshold to remain as a candidate for splitting. If, as indicated by the positive exit from 736, the counter for the page is below the minimum threshold, then the data page may be removed as a candidate for splitting.

The attempt to access the data page may incur a wait, as indicated by 720. In some embodiments, additional criteria may have to be satisfied for the wait to be tracked. For example, in some embodiments, waits may only be considered incurred if the wait results in a context switch for the attempt to access the data page (e.g., where an execution thread that performs the access request to the data page is suspended, storing overhead information to memory, which is then later retrieved when resuming the thread). In some embodiments, the type of access request may determine whether a wait is incurred. For example, if the wait is caused by another access request that is reading the data page, then a wait may not be considered incurred for the purpose of tracking access contention to split the data page.

If, as indicated by the positive exit from 720, a wait is incurred, then a determination may be made as to whether the data page is a candidate. If not, then the data page may be identified as a candidate for splitting, as indicated at 732. Tracking information for the data page may be created and a counter for the page may be started. In some embodiments, the number of candidate data pages at any one time may be limited. Although not illustrated in FIG. 7, if a data page is identified as a candidate but identifying the page as a candidate would exceed the limitation on candidate pages, then the data page may not be identified as a candidate.

In some embodiments, a candidate timeout may be implemented. In this way, those pages that experience contention infrequently are not split, whereas those pages that frequently experience contention may be split. For example, if the time between waits incurred for the data page is longer than the timeout (e.g., time>1 sec.), as indicated by the negative exit from 740, then the data page may be removed as a candidate for splitting, as indicated at 742. For a candidate data page that incurs a wait that does not exceed the timeout, the wait counter for the data page may be incremented, as indicated at 750. A determination may be made as to whether the counter is above a split threshold for the data page, as indicated at 760. If so, then the data page may be identified for splitting.

Tracking information may be maintained for data pages in different ways. For example, in some embodiments, a hash table may be utilized to maintain tracking information. The ranges of hash values assigned to different entries may be utilized to enforce a limitation on the number of candidate pages that may be tracked at a given time. For instance, if, as discussed above with regard to element 732, a data page may be identified as a candidate, a hash value may be generated for the page (e.g., based on a page identifier or other value associated with the data page). If the generated hash value maps to an available entry in the hash table then the data page may be identified as a candidate page. If the hash value maps to an unavailable entry (e.g., storing tracking data for another candidate data page), then the data page may not be identified as a candidate data page. When a split operation is performed on a data page in an entry in the hash table, the entry may be cleared or otherwise considered available. In at least some embodiments, the hash table may be implemented as a lock free data structure in order to avoid overhead for maintaining the hash table.

In addition to dynamically splitting data pages, in some embodiments, data pages may be merged. In this way storage space may be saved in those scenarios where data pages originally split because of access contention but no longer suffer from the access contention that instigated the split. FIG. 8 is a high-level flowchart illustrating techniques for dynamically merging index data pages, according to some embodiments.

Similar to FIG. 6 above, data may be maintained for a table in a data store across multiple data pages implemented as part of an indexing structure for the table, as indicated at 810. Access contention for different data pages in the indexing structure may be monitored, in some embodiments, as indicated at 820. Similar tracking information may be maintained and updated in response to new access requests, as discussed above with regard to FIG. 7, and may include any information which can be used to analyze or identify contention on a data page, such as the number of access requests to a data page by type (e.g., read requests or write requests), the number of items stored in the data page, or the number of waits incurred when accessing the data page. The tracking information may then be evaluated to determine whether a merge operation should be performed for a data page. If, for instance, the access contention for a data page falls below a minimum contention threshold (e.g., the counter above at 734 falls below 0), then the data page may be identified for merging. Some data pages may be excluded from merge operations. For example, data pages that are full beyond a merge exclusion threshold (e.g., 80% full). In this way, data pages that are close to a split operation initiated due to lack of space (instead of access contention) are not merged only to be split again.

If one data page is identified for merging, as indicated by the positive exit from 830, then a determination may be made as to whether an adjacent page is identified for merging. Adjacent pages may be data pages that store data that is adjacent to the data in the identified data page (e.g., leaf pages on either side of the identified leaf page at the same level in the tree structure). Adjacent pages may, in some embodiments, not be identified for merging if the adjacent page is a candidate for splitting or store data that when combined with the identified data page would exceed a full page threshold. If, as indicated by the negative exit from 840, an adjacent page is not identified for merging, then monitoring may continue but no merging is performed. If, however, an adjacent page is identified for merging, then as indicated at 850, the data page and the sibling data page may be merged to store data from the data page and the sibling data page in a same data page. In at least some embodiments, merging techniques, such as those described in FIG. 8, may be limited to those data pages for which splitting as a result of access contention has been previously performed. Other limitations, such as time periods during which no merging operations can be performed for a data page (e.g., after a split operation has been performed to store data on the data page), may be enforced to prevent scenarios where data pages are merged and split again.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 9:
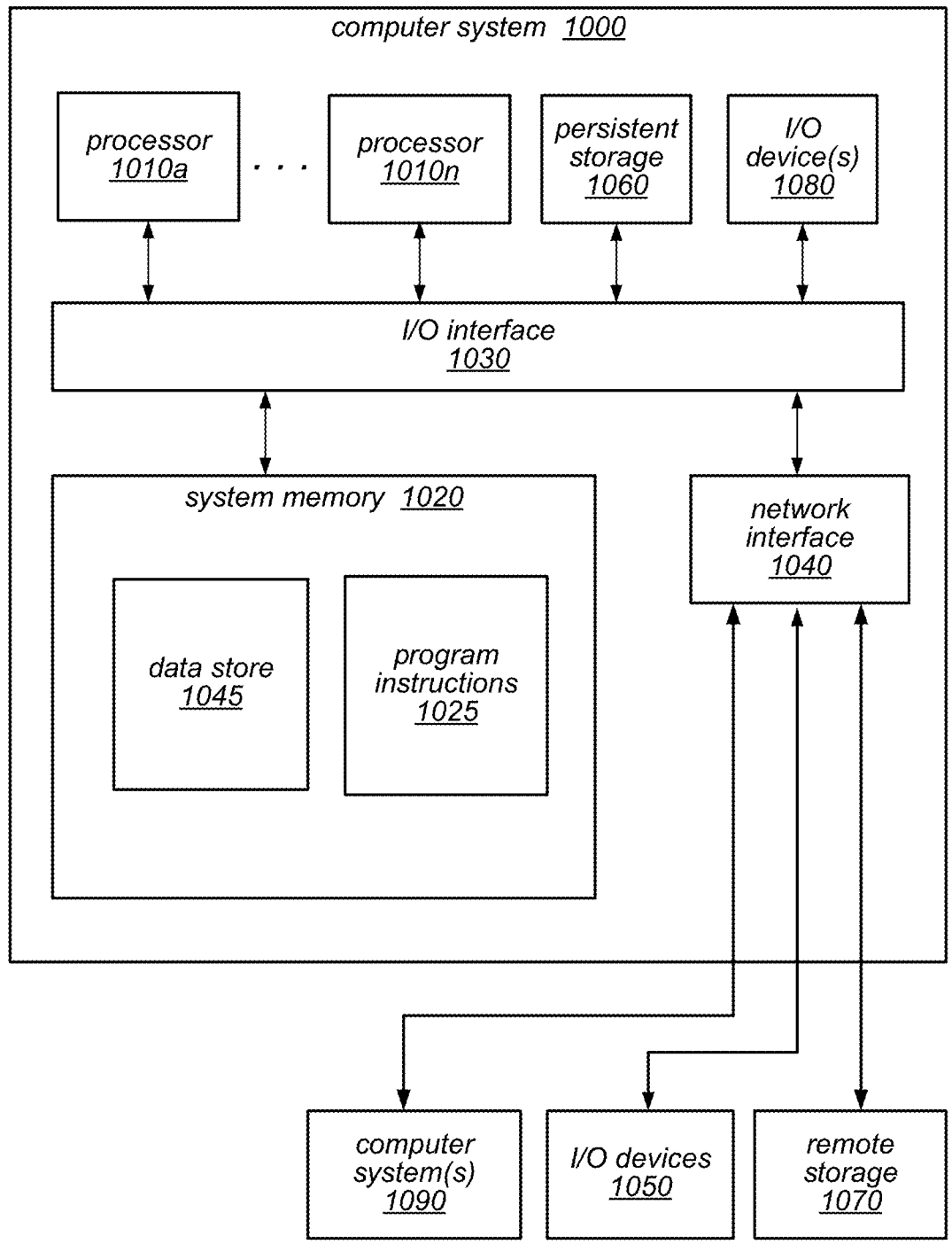
FIG. 9 is an example computer system, according to various embodiments.

FIG. 9 is a block diagram illustrating a computer system configured to implement dynamic splitting of contentious index data pages, as well as various other systems, components, services or devices described above. For example, computer system 1000 may be configured to implement a database engine head node of a database tier, or one of a plurality of storage nodes of a separate distributed storage system that stores databases and associated metadata on behalf of clients of the database tier, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the database tier (e.g., on a database engine head node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, coalesced data pages, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
    one or more persistent storage devices that store data for a table across a plurality of data pages as part of a data store, wherein the plurality of data pages are stored as part of an indexing structure for the table, wherein each of the plurality of data pages stores a different byte range of the data for the table, and wherein access requests to the table are serviced via the index structure in order to locate corresponding data pages to perform the access requests;
    at least one processor;
    a memory, storing program instructions that when executed by the at least one processor cause the at least one processor to implement a storage engine, the storage engine configured to:
        update tracking information for one or more data pages of the plurality of data pages in order to monitor access contention with respect to the one or more data pages, wherein the tracking information comprises respective numbers of waits incurred when obtaining access to the one or more data pages, and wherein individual ones of the waits are incurred by concurrent access requests to the one or more data pages to ensure consistent use of the indexing structure;
        evaluate the tracking information to identify a data page of the one or more data pages for a split operation, wherein the data page stores a particular byte range of the data for the table, and wherein the evaluating identifies the data page as having a number of waits incurred that exceeds a split threshold;

perform the split operation upon the data page to split the particular byte range of the data such that subsequently performed access requests to the particular byte range of the data are divided between different data pages to reduce access contention, wherein to split the particular byte range of the data, the storage engine further configured to store respective different byte ranges of the particular byte range of the data on respective ones of the different data pages, wherein the different data pages comprise the data page and one or more other data pages of the plurality of data pages, and wherein the respective different byte range of the particular byte range stored on the data page replaces the particular byte range of the data.

2. The system of claim 1, wherein to identify the data page of the one or more data pages for a split operation, the storage engine is configured to determine that a number of attempts to access the data page incurring waits exceeds the split threshold.

3. The system of claim 1, wherein the storage engine is further configured to:
identify one or more of the different data pages as candidate data pages to track for access contention in response to one or more respective access requests incurring waits for the different data pages; and
upon performance of the split operation upon the data page, remove the data page from the candidate data pages to track.

4. The system of claim 1, wherein the storage engine is implemented as part of a network-based database service and wherein the one or more persistent storage devices are implemented as part of a separate network-based storage service.

5. A method, comprising:
performing, by one or more computing devices:
maintaining data for a table stored in a data store across a plurality of data pages, wherein the plurality of data pages are maintained as part of an indexing structure for the table, wherein each the plurality of data pages stores a different byte range of the data for the table, and wherein access requests to the table are serviced via the index structure in order to locate corresponding data pages to perform the access requests;
monitoring access contention for one or more data pages of the plurality of data pages to identify a data page of the one or more data pages for splitting, wherein monitoring access contention for the one or more data pages comprises maintaining tracking information comprising a number of waits incurred when obtaining access to the one or more data pages, wherein the data page stores a particular range of the data for the table, wherein individual ones of the waits are incurred by concurrent access requests to the one or more data pages to ensure consistent use of the indexing structure, and wherein the monitoring identifies the data page as having a number of waits incurred that exceeds a split threshold; and
splitting the data page to store respective different byte ranges of the particular byte range of the data in respective ones of different data pages such that subsequently performed access requests to the data are divided between the different data pages to reduce access contention, wherein the different data pages comprise the data page and one or more other data pages of the plurality of data pages, and wherein the respective byte range of the particular byte range to store on the data page replaces the particular byte range of the data.

6. The method of claim 5, wherein monitoring the access contention for the one or more data pages comprises:
updating tracking information in response to attempts to access the one or more data pages; and
evaluating the tracking information to determine that a number of attempts incurring waits for the data page exceeds the split threshold.

7. The method of claim 5, further comprising:
identifying one or more of the different data pages as candidate data pages to monitor for splitting in response to one or more respective access requests incurring waits for the different data pages; and
upon splitting the data page, removing the data page from the candidate data pages to monitor.

8. The method of claim 7, wherein identifying the one or more of the different data pages is performed such that a monitoring limitation on a number data pages that may be identified as candidate data pages is not exceeded.

9. The method of claim 5, wherein monitoring the access contention for the different data pages comprises determining that a number of items in the one or more data pages exceeds a minimum item threshold for splitting.

10. The method of claim 5, further comprising:
prior to performing the monitoring and the splitting, automatically enabling the monitoring of access contention for the table based, at least in part on an evaluation of a workload of the table.

11. The method of claim 5, further comprising:
receiving a request to disable monitoring of access contention of the table from a client via a programmatic interface for the data store; and
in response to receiving the request, disabling monitoring of the access contention of the different data pages.

12. The method of claim 5, further comprising:
monitoring the access contention of the one or more data pages to identify a plurality of other data pages for merging, wherein the one or more data pages is a plurality of data pages, comprising:
determining that the plurality of other data pages are adjacent data pages; and
merging the plurality of other data pages in order to store the respective byte ranges of the data at the plurality of other data pages as a particular byte range of data on a same data page such access requests directed to the data the plurality of other data pages are directed to the same data page.

13. The method of claim 5, wherein the data store is a network-based storage service storing the table on behalf of a client of the network-based storage service.

14. A non-transitory, computer-readable storage medium, storing program instructions that when executed by one or more computing devices cause the one or more computing devices to implement:
maintaining data for a table stored in a data store across a plurality of data pages, wherein the plurality of data pages are maintained as part of an indexing structure for the table, wherein each the plurality of data pages stores a different byte range of the data for the table, and wherein access requests to the table are serviced via the index structure in order to locate corresponding data pages to perform the access requests;

tracking access contention for one or more data pages of the plurality of data pages, wherein tracking access contention for the one or more data pages comprises maintaining tracking information comprising a number of waits incurred when obtaining access to the one or more data pages, and wherein individual ones of the waits are incurred by concurrent access requests to the one or more data pages to ensure consistent use of the indexing structure;

identifying a data page of the one or more data pages of the plurality of data pages for a split operation according to the tracking of the access contention, wherein the data page stores a particular byte range of the data for the table and wherein the tracking of the access contention identifies the data page as having a number of waits incurred that exceeds a split threshold; and performing the split operation upon the data page to store respective different byte ranges of the particular byte range of the data in respective ones of different data pages such that subsequently performed access requests to the data are divided between the different data pages to reduce access contention, wherein the different data pages comprise the data page and one or more other data pages of the plurality of data pages, and wherein the respective byte range of the particular byte range to store on the data page replaces the particular byte range of the data.

15. The non-transitory, computer-readable storage medium of claim 14, wherein, in identifying the data page for the split operation, the program instructions cause the one or more computing devices to implement determining that a number of attempts to access the data page incurring waits exceeds the split threshold within a time period.

16. The non-transitory, computer-readable storage medium of claim 14, wherein one or more of the different data pages are identified as candidate data pages to track for access contention and wherein the programming instructions cause the one or more computing devices to further implement:

identifying another data page of the plurality of data pages as a candidate data page to track for access contention in response to one or more access requests to the other data page.

17. The non-transitory, computer-readable storage medium of claim 14, wherein the program instructions cause the one or more computing devices to further implement:

performing the split operation in response to receiving another request to access the data page.

18. The non-transitory, computer-readable storage medium of claim 14, wherein the indexing structure is a tree, and wherein the program instructions cause the one or more computing devices to further implement:

enabling the tracking of the access contention for the one or more data pages prior to the tracking and in response to determining that a height of the tree is less than a maximum height threshold.

19. The non-transitory, computer-readable storage medium of claim 14, wherein the programming instructions cause the one or more computing devices to implement:

in response to detecting a tracking disabling event, automatically disabling the tracking of access contention for the table.

20. The non-transitory, computer-readable storage medium of claim 14, wherein the one or more computing devices implement a storage engine and wherein the data store is a relational database.

* * * * *